UNITED STATES PATENT OFFICE.

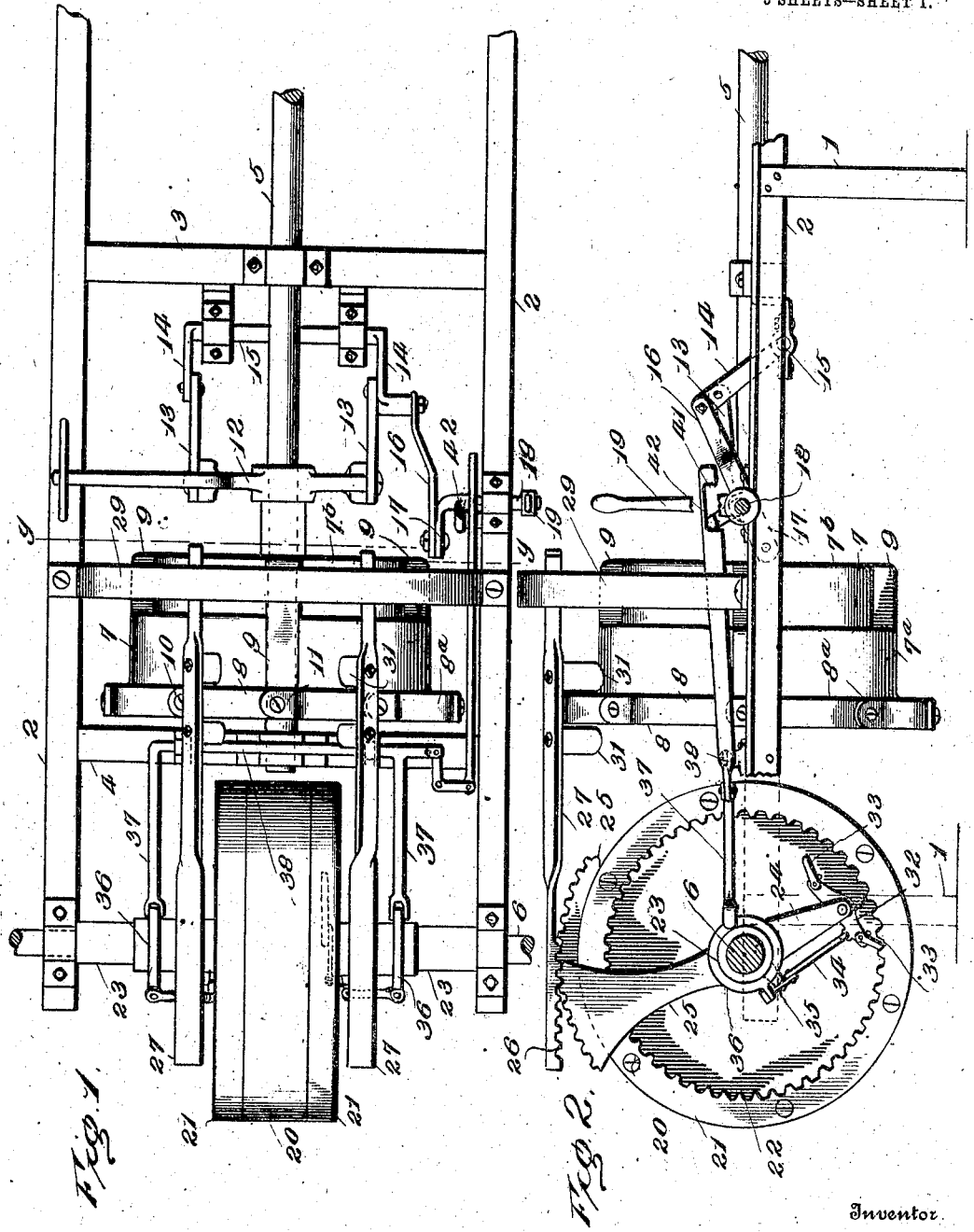

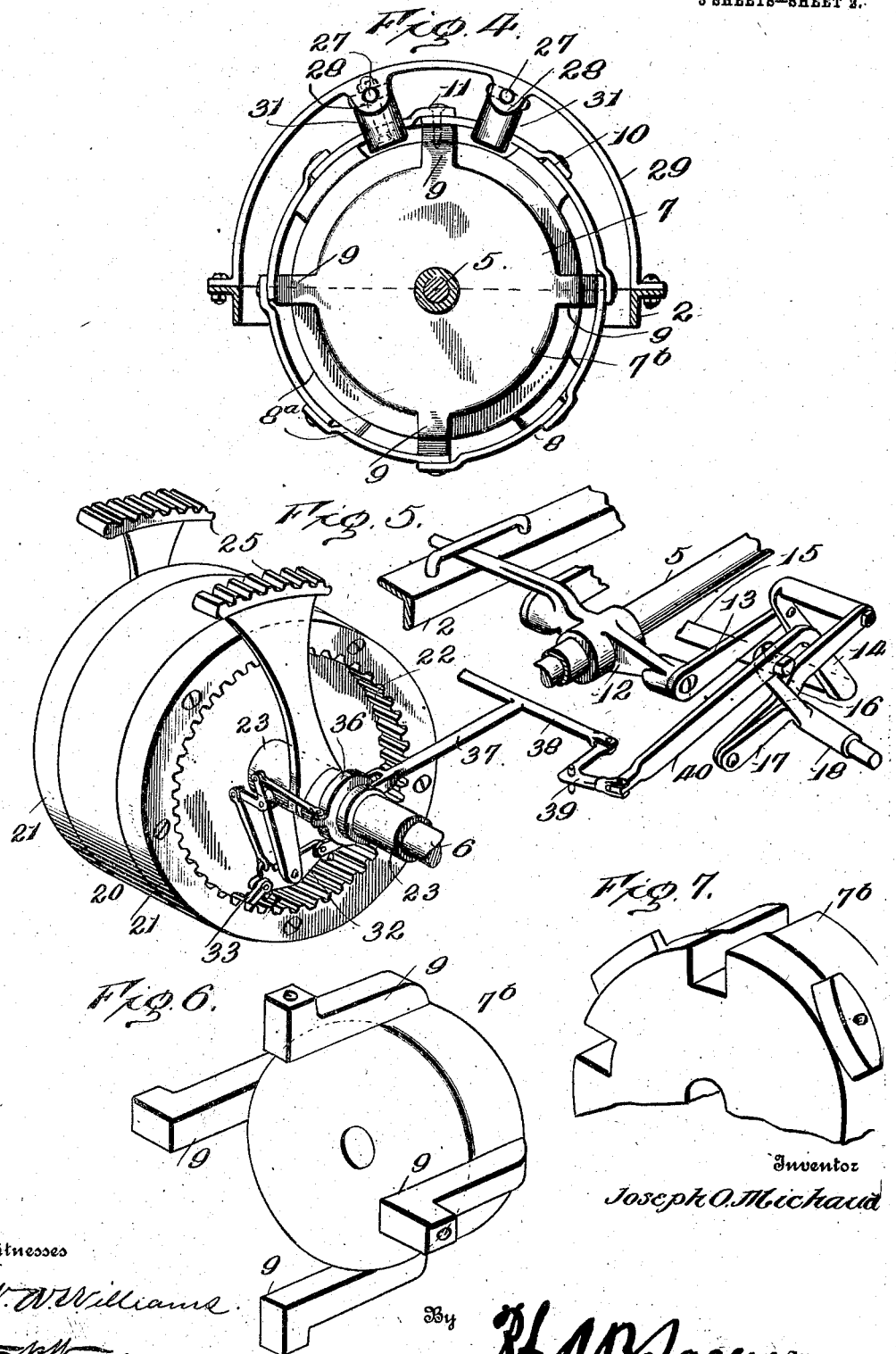

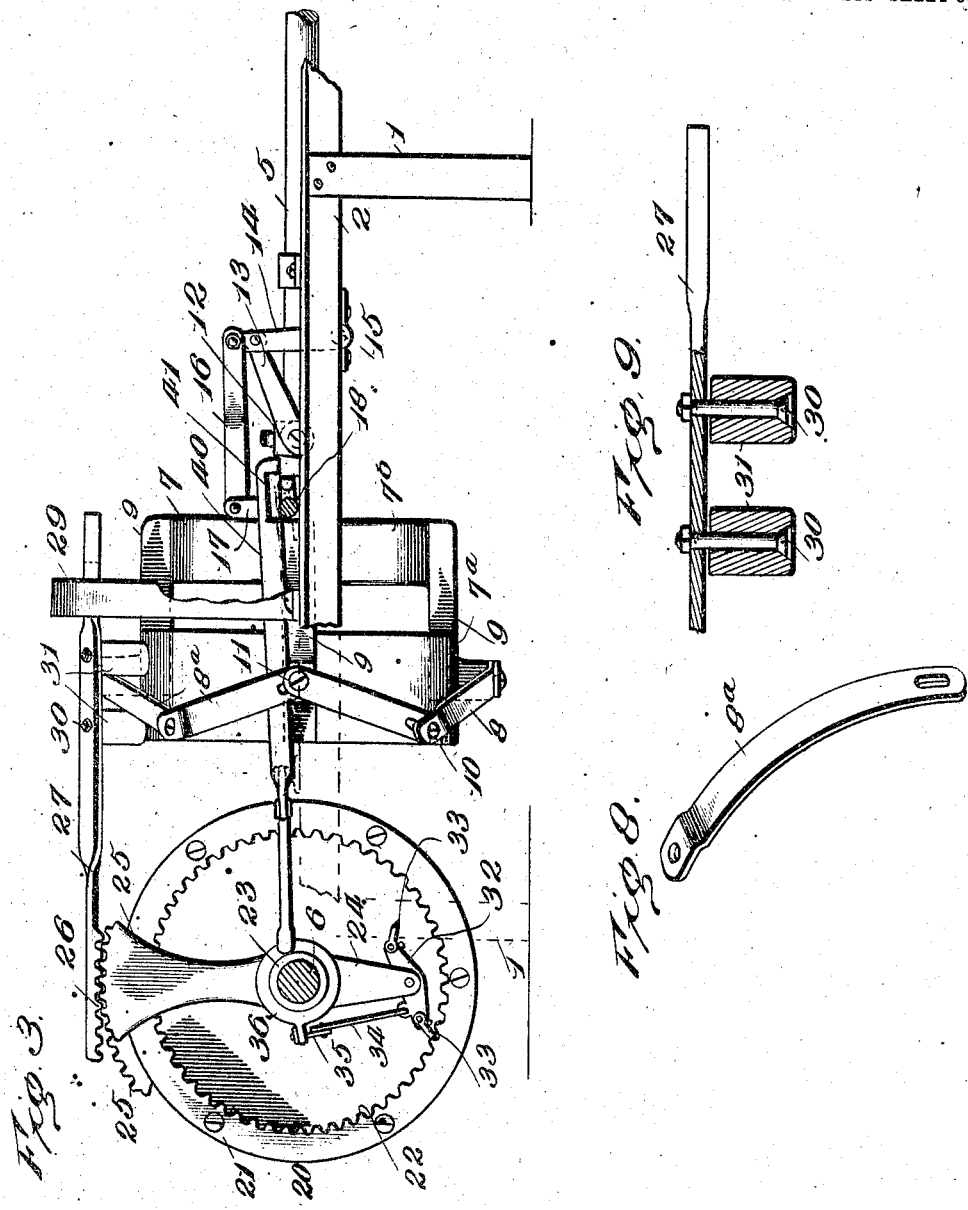

JOSEPH O. MICHAUD, OF FORT KENT, MAINE.

POWER-TRANSMISSION MECHANISM.

No. 899,420.　　　Specification of Letters Patent.　　Patented Sept. 22, 1908.

Application filed August 3, 1907. Serial No. 386,964.

*To all whom it may concern:*

Be it known that I, JOSEPH O. MICHAUD, citizen of the United States, residing at Fort Kent, in the county of Aroostook and State of Maine, have invented certain new and useful Improvements in Power-Transmission Mechanism, of which the following is a specification.

The present invention relates to certain new and useful improvements in power transmitting devices and is designed more particularly for use in connection with automobiles or like self-propelled vehicles.

The object of the invention is to provide a transmission gearing which is peculiarly designed to permit the direction of rotation of the driven part to be readily reversed and the speed thereof to be regulated and maintained at any desired point up to the maximum.

A further object of the invention is to design a power transmitting device of this character which is compact in its structure and places the speed and direction of rotation of the driven part under the positive control of the operator.

For a full description of the invention and the merits thereof and also to acquire a knowledge of the details of construction and the means for effecting the result, reference is to be had to the following description and accompanying drawings, in which:

Figure 1 is a top plan view of the improved transmission gearing. Fig. 2 is a side elevation of the same showing the various parts in the position assumed when no motion is imparted from the driving member to the driven member. Fig. 3 is a similar view showing the parts in the position assumed when transmitting motion from the driving member to the driven member. Fig. 4 is a transverse sectional view on the line $y-y$ of Fig. 1. Fig. 5 is a detached perspective view of the clutch mechanism and cooperating parts and of the levers for controlling the speed and direction of rotation of the driven member. Fig. 6 is a detail view of the movable disk upon the driving shaft. Fig. 7 is a similar view of the rigid disk upon the driving shaft. Fig. 8 is an enlarged detail view of one of the track sections. Fig. 9 is a similar view of one of the reciprocating rods, portions being broken away and shown in sections.
Corresponding and like parts are referred to in the following description and indicated in all the views of the drawings by the same reference characters.

In the present instance the power transmitting device is shown as mounted upon a frame supported by the legs 1 and comprising the longitudinal side pieces 2 connected at one end by the cross bar 3 and at an intermediate point by a second cross bar 4. Journaled upon the two cross bars 3 and 4 and disposed longitudinally with respect to the frame is the driving shaft 5 which may receive power from a gasolene engine, motor, or other source not shown. A transverse shaft 6 is journaled between the side pieces 2 of the frame at one end thereof and constitutes the driven shaft. Where the transmission gearing is employed in connection with automobiles this transverse shaft 6 may be constituted by the rear axle of the machine. A revoluble member 7 is mounted upon the driving shaft 5 to rotate therewith and carries upon its periphery a continuous track 8 which is formed in sections $8^a$, means being provided for holding the various sections either in alinement with each other or at angles to each other. In the latter instance the track 8 becomes irregular and assumes a zig zag direction. The revoluble member 7 comprises a pair of companion disks $7^a$ and $7^b$, the former being rigid with the driving shaft while the latter revolves therewith but is designed to slide longitudinally thereon. In the periphery of the disk $7^a$ are formed transverse grooves loosely receiving arms 9 projecting from the slidable disk $7^b$. Each of the track sections $8^a$ has one end thereof pivotally connected to the disk $7^a$ as indicated at 10 while the opposite end is pivotally connected at 11 to one of the arms 9. It may also be mentioned that one end of each of the track sections $8^a$ is formed with a slot for receiving the corresponding pivot pin to permit of the adjustment to be hereinafter described. When the slidable disk $7^b$ abuts against the disk $7^a$ the various sections of the track 8 are in alinement with each other, while when the slidable disk $7^b$ is moved away from the fixed disk $7^a$ the track sections are thrown at angles to each other and the track 8 assumes a zig zag direction, the angles between the various track sections depending upon the distance through which the slidable disk $7^b$ is moved. A head 12 is carried by the slidable disk $7^b$ and moves longitudinally upon the shaft with the disk, but is mounted to permit the disk to rotate independently thereof. Opposite ends of the head 12 are connected by links 13 to crank arms 14 upon a rock shaft 15 journaled within suitable bearings carried by the cross bar 3. One of the crank arms 14 is also connected by a rod 16 to a crank 17 upon a shaft 18 having the lever 19 rigidly connected thereto. It will thus be apparent that by swinging the lever 19 the slidable disk 7$^b$ can be adjusted longitudinally upon the driving shaft 5 and the various track sections 8 thrown either into alinement with each other or at the required angle.

The driven shaft 6 is designed to be rotated in either direction by means of a clutch mechanism actuated by the revoluble track 8, the speed of rotation of the driven shaft depending upon the angle between the various sections 8$^a$ of the track. A pulley 20 is fast upon the driven shaft 6 and is provided upon its opposite sides with the laterally extending annular rims 21 formed upon the inner faces with the teeth 22. Loosely mounted upon the shaft 16 upon each side of the pulley 20 is a sleeve 23, each of the said sleeves having a pair of oppositely extending arms projecting therefrom, the arms 24 carrying a reversible clutch mechanism for cooperating with the teeth 22 while the arms 25 are formed with segmental gearing. This segmental gearing meshes with toothed portions 26 of the connecting rods 27 which are mounted to receive a reciprocating motion from the revoluble track 8. The extremities of the connecting rods 27 are received loosely within blocks 28 carried by an arch member 29 and the said connecting rods are each provided with lateral extensions 30 projecting upon opposite sides of the track 8, the said extensions preferably having anti-friction rollers 31 journaled thereon for engagement with the track. When the various track sections are in alinement with each other and the driving shaft 5 is rotated the connecting rods 27 assume a fixed position and no motion is imparted to the shaft 6. However when the track sections 8 are thrown at an angle to each other and the track given a zig zag direction the rollers 1 in following the tortuous path of the track impart a reciprocating motion to the connecting rods which produces an oscillatory movement of the arms 24 and 25 and operates through the clutch mechanism to revolve the pulley 20 and the shaft 6. It will be readily apparent that the amplitude of the reciprocating movement of the connecting rods 27 depends upon the magnitude of the angle existing between the various track sections 8$^a$ and that the speed of rotation of the driven shaft 6 is in turn dependent upon such amplitude of movement of the connecting rods. The driving shaft 5 is designed to be rotated at a uniform speed and the driven shaft 6 may either be held stationary by throwing the track sections 8$^a$ into alinement with each other or caused to revolve at any required speed by properly regulating the angle between the track sections.

The clutch device is in the nature of a shoe 32 pivotally mounted at an intermediate point upon the extremity of each of the arms 24, the opposite ends of each shoe carrying the pawls 33, the direction of rotation of the driven shaft depending upon which set of the pawls is moved into coöperative relation with the teeth 22. By swinging the shoe 32 upon its pivot either set of the pawls may be moved into an operative position and for the purpose of thus swinging the shoe a trip rod 34 is utilized, one end of the trip rod being connected to the shoe while the opposite end is connected to a bell crank lever 35 pivoted upon the arm 24. The opposite arm of this bell crank lever 35 has an operative connection with a collar 36 slidable upon the sleeve 23, the two collars upon opposite sides of the pulley 20 being connected by arms 37 to a slide 38. By properly adjusting the said slide the shoes 32 can be swung upon their pivots to throw either set of the pawls 33 into engagement with the teeth 22 and the direction of rotation of the driven shaft thereby reversed. A bell crank lever 39 is utilized for moving the slide 38 to adjust the clutch device and the said bell crank lever is actuated by a bar 40 provided at one end with a notch 41 engaging a second crank arm 42 upon the lever shaft 18.

The crank arm 42 is disposed at approximately right angles to the crank 17 governing the track 8 and extends upwardly in an operative position when the said crank 17 projects rearwardly in alinement with the rod 16 and a dead center is produced between the latter two members as indicated in Figs. 2 and 5, the track sections 8$^a$ being then in an inoperative position should the lever 19 be swung to the left the crank 17 will move downwardly, while should the said lever be swung to the right the crank will move upwardly. In either instance however, the rod 16 will be moved to the right and will operate through the medium of the crank arms 14 and links 13 to move the slidable disk 7$^b$ away from the disk 7$^a$, thereby throwing the track sections 8$^a$ out of alinement with each other. It will thus be apparent that the track sections will be thrown in an operative position regardless of whether the lever is moved to the right or left, but as hereinafter explained the driven member will be rotated in one direction in one instance and in an opposite direction in the other instance. In Figs. 2 and 5 the pawls 33 at the left of the shoes 32 are in an operative position and should the lever 19 be swung to the right, the crank arm 42 will drop out of the notch 41 without moving the bar 40 or in any manner interfering with the clutch mechanism.

However should the lever 19 be swung to the left the crank arm 42 would engage the shoulder at the left of the notch 41 and move the bar 40 to the left previous to dropping out of the notch 41, and this movement of the bar 40 would reverse the direction of rotation of the driven shaft by shifting the pawls 33 at the left of the shoes 32 into an inoperative position and moving those pawls 33 at the right of the said shoes into engagement with the teeth 22. With the bar 40 thus set it will be obvious that the shoes 32 would be again moved into their original position should the lever 19 be swung back to the right, but that in any instance the track sections 8ª will be moved into alinement with each other previous to the reversing of the clutch mechanism.

It will thus be apparent that the lever 19 controls both the clutch mechanism for reversing the direction of motion of the driven shaft and the revoluble track 8 governing the speed of rotation of the said shaft.

Having thus described the invention, what is claimed as new is:

1. In a power transmitting device, the combination of a sectional track, means for adjusting the angle between the sections of the track, means for moving the track, a driven member, and means actuated by the moving of the track for driving the driven member.

2. In a power transmitting device, the combination of a pair of shafts, a continuous track turned by one of the shafts, means for throwing portions of the track either into or out of alinement with each other, a clutch mechanism for operating the opposite shaft, and means whereby the clutch mechanism is actuated by the turning of the track when the sections thereof are out of alinement with each other.

3. In a power transmitting device, the combination of a pair of shafts, a continuous track turned by one of the shafts, means for throwing portions of the track either into or out of alinement with each other, a clutch mechanism for turning the opposite shaft, and connecting rods for actuating the clutch mechanism, the said connecting rods receiving movement from the track when the portions of the same are out of alinement with each other.

4. In a power transmitting device, the combination of a pair of shafts, a revoluble member upon one of the shafts, a sectional track mounted upon the revoluble member, means for moving the track sections either into or out of alinement with each other, a reciprocating rod designed to receive movement from the track, and means whereby the reciprocating rod operates to turn the opposite shaft.

5. In a power transmitting device, the combination of a pair of shafts, a revoluble member mounted upon one of the shafts, a sectional track carried by the revoluble member, means for throwing the track sections either into or out of alinement with each other, a clutch mechanism for turning the opposite shaft, and a connecting rod for actuating the clutch mechanism, the said connecting rod being designed to receive motion from the track.

6. In a power transmitting device, the combination of a pair of shafts, disks mounted upon one of the shafts to rotate therewith, one of the disks being movable upon the shaft, a sectional track carried by the disks, the angle between the track sections being adjustable by sliding the movable disk, and means actuated by the track for rotating the second shaft.

7. In a power transmitting device, the combination of a pair of shafts, a pair of disks mounted upon one of the shafts to rotate therewith, one of the disks being movable, a sectional track carried by the two disks, the angle between the track sections being adjustable by sliding the movable disk, a clutch mechanism for turning the second shaft, and a reciprocating rod for actuating the clutch mechanism, the said reciprocating rod being designed to receive motion from the before mentioned track.

8. In a power transmitting device, the combination of a pair of shafts, a pair of disks mounted upon one of the shafts to rotate therewith, one of said disks being movable and carrying arms loosely engaging the opposite disk, a track formed in sections loosely connected to the first mentioned disk and the arms of the second mentioned disk, the angle between the track sections being adjustable by moving the second mentioned disk, a clutch mechanism for turning the second shaft, and a reciprocating rod for actuating the clutch mechanism, the said reciprocating rod being designed to receive motion from the before mentioned track.

9. In a power transmitting device, the combination of a sectional track, means for adjusting the angle between the sections of the track, a driven member, and a reciprocating rod for actuating the driven member, the said reciprocating rod being designed to receive motion from the before mentioned track.

10. In a power transmitting device, the combination of a sectional track, means for adjusting the angle between the track sections, means for moving the track, a reciprocating rod receiving movement from the track, a driven part, and a clutch mechanism for moving the driven part, the said clutch mechanism being actuated by the reciprocating rod.

11. In a power transmitting device, the combination of a movable track formed in sections, means for adjusting the angle between the track sections, means for moving the track, a driven shaft, a reversible clutch mechanism for turning the driven shaft, means for reversing the clutch mechanism, and a reciprocating rod receiving motion from the track and designed to actuate the clutch mechanism.

12. In a power transmitting device, the combination of a sectional track, means for adjusting the angle between the track sections, means for moving the track, a driven shaft, a reversible clutch mechanism for turning the driven shaft, a reciprocating rod receiving motion from the track and actuating the clutch mechanism, and a single member controlling the reversible clutch and the angle between the track sections.

13. In a power transmitting device, the combination of a pair of shafts, a revoluble member mounted upon one of the shafts for rotation therewith, a sectional track carried by the revoluble member, means for adjusting the angle between the track sections, a reversible clutch mechanism for turning the second shaft, reciprocating arms receiving motion from the before mentioned track and actuating the clutch mechanism, and a single member controlling both the reversible clutch mechanism and the angle between the track sections.

14. In a power transmitting device, the combination of a shaft, a pulley upon the shaft, a sleeve loose upon the shaft, arms projecting in opposite directions from the sleeve, a clutch device carried by one of the arms for turning the pulley, segmental gearing carried by the opposite arm, a reciprocating rod provided with a toothed portion engaging the segmental gearing, and means for actuating the reciprocating rod.

In testimony whereof I affix my signature in presence of two witnesses.

JOSEPH O. MICHAUD. [L. S.]

Witnesses:
HENRY W. NADEAU,
ELMER J. BURNHAM.